Feb. 23, 1965

M. A. POPELIER 3,170,579

HYDRAULIC CONTROL STRUCTURE

Filed April 5, 1963

INVENTOR.
M. A. POPELIER

BY *William A. Murray*

ATTORNEY

Feb. 23, 1965   M. A. POPELIER   3,170,579
HYDRAULIC CONTROL STRUCTURE
Filed April 5, 1963   2 Sheets-Sheet 2

INVENTOR.
M. A. POPELIER
BY William A. Murray
ATTORNEY

United States Patent Office 3,170,579
Patented Feb. 23, 1965

3,170,579
HYDRAULIC CONTROL STRUCTURE
Maurice A. Popelier, East Moline, Ill., assignor to Deere & Company, Moline, Ill., a corporation of Delaware
Filed Apr. 5, 1963, Ser. No. 270,937
7 Claims. (Cl. 214—138)

This invention relates to a power implement and more particularly to a power implement of the type having a boom, ground-working implements attached thereto, and hydraulic means for raising and lowering the boom and operating the ground-engaging means. Still more particularly this invention relates to the valve control mechanism utilized in moving fluid to and from the hydraulic units of the implement and is even more particularly directed to a locking mechanism that may be utilized to prevent accidental or unauthorized use of the control elements.

Often in operating industrial equipment, it is necessary to utilize a hydraulically controlled bucket supported on a boom. The boom also is controlled for vertical movement by an hydraulic cylinder. Often this type of equipment is not in use and when not in use, the bucket, boom, or various parts of the implement is adapted to rest on the ground. Through negligence, many operators will leave their implements in a position whereby the effect of gravity will cause movement of various portions of the implement if for one reason or another the valve is moved or adjusted. This will occur even though the hydraulic pump controlling the fluid is not being operated. This, of course, creates a serious hazard to people who might be around the implement and accidents occurring under such circumstances are not uncommon in the industry. Also movement of parts of the implements when dismounted from the tractor often makes it difficult to remount the implement on the tractor.

With the above in mind, it is the main object of the present invention to incorporate a locking device associated with the valve control mechanism. The locking device may be operated by a key to lock the valves in their neutral position so that the valve levers cannot be moved, inadvertently or otherwise.

Specifically, it is the purpose of the present invention to provide a valve control mechanism having a series or bank of valves with reciprocating valve control elements extending from the valve. The elements have portions thereof that engage a locking member. The member may move from a locking position in which it engages the portions of the elements or may be moved to a remote or inoperative position in respect to the elements. Movement of the member occurs in response to rotation of a key. Between the key and member is a cam and a cam follower, the latter being directly associated with the key to rotate therewith and effect movement of the locking member to and from its remote and locking positions.

Other objects and advantages of the present invention will become apparent to those skilled in the art as the nature of the invention is better understood from the following description and as shown in the accompanying drawings.

Figure 1:
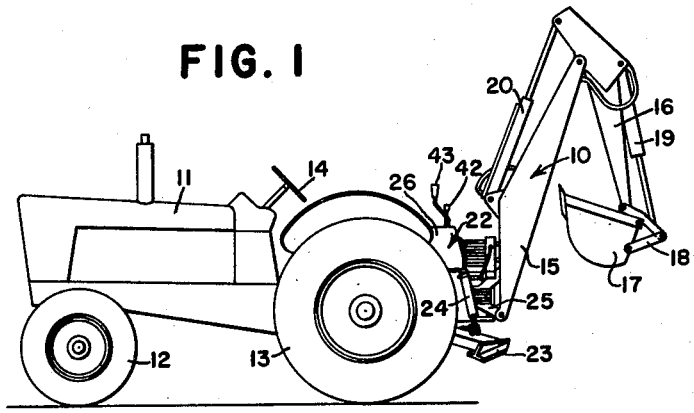
FIG. 1 is a side view of a tractor and a backhoe implement utilizing the features of the present invention.

The valve control mechanism here to be described is generally shown and described, for purposes of illustration in the environment of a backhoe 10. However it should be recognized that the invention would operate efficiently and to advantages in other environments. The backhoe 10 is supported on the rear end of a tractor having a body 11 supported on front steerable wheels 12 and on rear traction wheels 13. An operator's station, indicated by the steering wheel 14, is provided on the tractor and controls the various driving and implement control elements thereon. While not shown, the tractor is of the type having an hydraulic power system. The hydraulic units or means is used to operate various of the implements and attachments adaptable for connection to the tractor.

Figure 3:
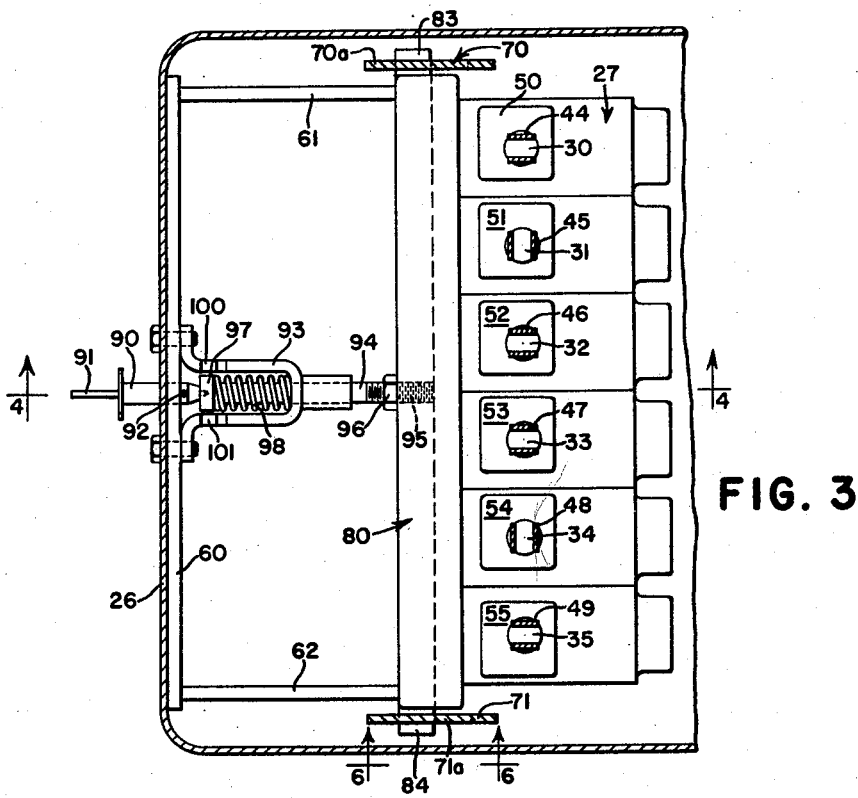
FIG. 3 is an enlarged sectional view taken substantially along the line 3—3 of FIG. 2.
Figure 4:
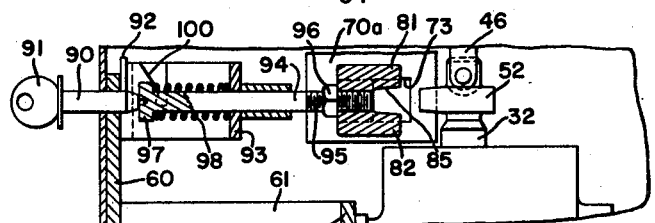
FIG. 4 is a sectional view taken substantially along the line 4—4 of FIG. 3.
Figure 5:
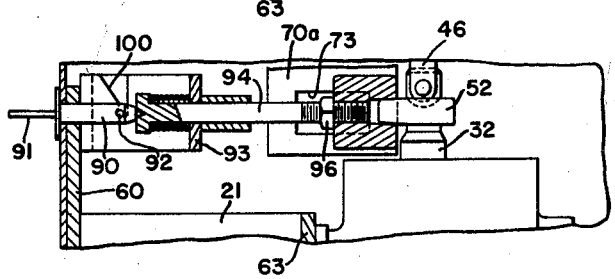
FIG. 5 is a view similar to FIG. 4 but showing a different position of the mechanism as shown in FIG. 4.
Figure 6:
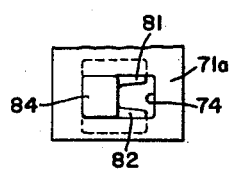
FIG. 6 is a view taken substantially along the line 6—6 of FIG. 3.

The backhoe 10 is composed of a vertically swingable boom 15 having a dipperstick 16 pivoted thereto on its outer end. A bucket 17 is pivotally mounted on the end of the dipperstick and is controlled by linkage 18 and an hydraulic cylinder 19 extending from the dipperstick to the linkage 18. The dipperstick 16 is swung vertically about the end of the boom 15 by means of an hydraulic cylinder 20 extending from the dipperstick to the boom. The boom structure is carried on a main supporting stand 22 mounted on the rear portion of the tractor and having retractable stabilizing legs 23 adapted to be raised and lowered into and out of ground-engaging position by hydraulic cylinders 24. The boom 15 is mounted on a barrel of a rotary type hydraulic motor 25 so that the entire backhoe may swing about a vertical axis. Consequently hydraulic means are utilized to operate the backhoe and particularly to operate the ground-engaging accessories such as the bucket 17 and stabilizing legs 23 associated with the backhoe 10. The main stand or support 22 carries on its upper side a support housing 26 enclosing a bank 27 of hydraulic valves having outlet means operatively connected to the various hydraulic units on the backhoe and its supporting structure. In conventional manner the outlet means includes fluid inlet and fluid return hoses, such as are indicated at 28, 29. The valve bank 27 has a series of transversely aligned valve spool elements 30, 31, 32, 33, 34, 35 adapted for vertical reciprocation in the individual valves of the valve bank 27. The control elements 30-35 are moved vertically by control linkage, not shown, but indicated in location by the reference numeral 40 and are manually controlled by suitable hydraulic levers, such as indicated at 42, 43. The means of connecting the control levers 42, 43 to the individual spool elements is shown and described in detail in U.S. Patent 2,979,081 issued to Messrs. James E. McCanse and Douglas C. Ager, April 11, 1961. If details of this connecting linkage are desired, reference may be made to that patent. However, generally, the linkages terminate in depending connecting links, such as is shown in section (FIG. 3) at 44, 45, 46, 47, 48 and 49 and are connected to the tops of the respective spools 30-35. As is conventional, the control elements 30-35 may be moved between neutral zones, in which no fluid moves through the respective valves to the hydraulic means, and operating zones in which fluid is moved through the valves and into the respective hydraulic means on the backhoe.

Fixed to the respective elements 30-35 are lock inserts or lugs 50, 51, 52, 53, 54 and 55. Upon the valves 30-35 all being positioned in a neutral zone, the members 50-55 lie in a common horizontal plane.

Figure 2:
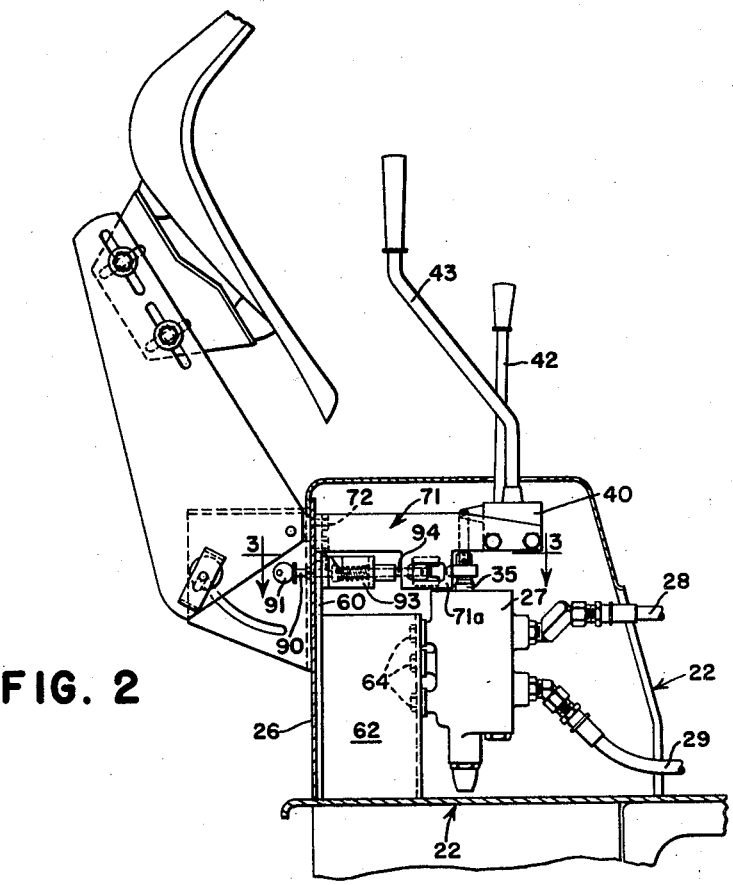
FIG. 2 is an enlarged vertical sectional view taken along a fore-and-aft vertical plane and showing a housing and the valve control mechanism for the backhoe.

The entire valve bank 27 is supported on the housing 26 and the main support 22 by means of additional supporting structure including an upright plate 60 lying adjacent the forward surface of the rear wall of the housing 26 and a pair of transversely spaced side plates 61, 62 projecting forwardly from the plate 60 and connected to the upper surface of the main support or structure 22. The forward edges of the side plates 61, 62 are interconnected by a second upright transverse plate 63 also supported at its lower edge by the upper surface of the main support 22. Bolted at 64, to the latter plate 63 are the individual valve blocks making up the entire valve bank 27. An additional pair of side plates 70, 71 is bolted at 72 to the rear wall of the housing 26 and carries at the forward end the linkage 40. Consequently, as may be seen from viewing FIG. 2, the entire valve control structure is carried on the main support 22.

The side plates 71 are T-shaped with lower depending portions 70a and 71a respectively having fore-and-aft extending slots 73, 74 respectively. Extending across the housing 26 and between the plate portions 70a, 71a is a transverse bar or lock member 80. The bar 80 is U-shaped in cross section and opens forwardly to have upper and lower leg portions 81, 82 spaced vertically apart to define a groove 85 receiving the various insert lugs 50–55. The ends of the bar 80 are reduced to define lugs 83, 84 that extend through the respective slots 73, 74. The lugs 83, 84 are square in cross section and are of the same height as the slots 73, 74 and consequently the bars are retained against angular movement, but may be moved fore and aft.

By limiting the movement of the locking bar or member 80 in a fore-and-aft direction, the groove 85 may engage the inserts 50–55 only when their respective spool elements 30–35 are in their neutral zones. In this position the bar 80 may be moved so that the groove 85 embraces from opposite sides the inserts and consequently all the control elements or spools are locked in their neutral zone.

The bar 80 is released for movement fore-and-aft by means of a key control composed of a small horizontally disposed rod 90 having a suitable opening for insertion of a key 91. The rod extends through the wall of the housing 26 and the plate 60 and has a radially extending pin 92 connected thereto internally of the plate 60. Supported on the wall 60 is a U-shaped horizontally disposed support 93 having its bight portion facing the bar 80. A connecting rod 94 extends through the bight portion between the end of the rod 90 and the bar 80 where it is threadedly attached at 95. A nut 96 locks the connecting rod 94 to the bar 80. The rear end of the rod 94 has a collar 97 and carries a spring 98 between the collar 97 and the bight portion of the U-brace 93. Consequently the rod 94 and the bar 80 is baised to its rear position which is remote in respect to the spindles 30–35.

On each of the legs of the U-shaped bracket 93 are cam surfaces 100, 101 that open upwardly. The pin 92 operates as a follower as the rod 90 is rotated and contacts one of the cam surfaces 100, 101 and drives the pin 94 and the bar 80 forwardly and into contact with the inserts 50–55. The lower ends of the cam surfaces 100, 101 are suitably formed so that the follower pin 92 will be held against axial movement when in this position. Consequently when in the latter position the key may be removed and the entire locking device be held in an engaging or locking position with the inserts 50–55.

It should be recognized that the present invention when used with the particular type of implement shown will have considerable safety features since an operator may leave his station and be confident that no one will accidentally move the levers 42, 43 to cause portions of the backhoe 10 to shaft. Also, when the backhoe is detached from the tractor, it is often necessary for different reasons such as space requirement to leave the backhoe in a type of jackknife position. Accidental movement of the levers 42, 43, unless the valve elements 30–35 were locked, would cause collapsing of one or more of the hydraulic cylinders and consequently the entire backhoe could collapse and considerable injury could occur.

While only one form of the invention has been shown, it should be recognized that other forms and variations may occur to those skilled in the art. Therefore, while the preferred form is shown in concise and detailed manner for the purpose of completely illustrating the principles of the invention, it is not the intention to limit or narrow the invention beyond the broad concept set forth in the appended claims.

What is claimed is:

1. In a power implement including a boom, ground-engaging accessories associated with the boom, hydraulic means for raising and lowering the boom and operating the ground-engaging accessories, the combination therewith of a hydraulic control structure comprising: a main support; valve structure operatively connected with the hydraulic means carried on the support and including a multiple valve bank with a series of aligned reciprocal valve control elements, each movable between a neutral zone and an operating zone, each element having a member-receiving portion thereon with each portion being substantially coplanar with the portions of the other elements when the elements are in the neutral zone; a locking member supported on the support for movement toward and away from the elements between a locking position in which the member engages the member-receiving portions of the elements when in their neutral zone and a remote position in respect to the control elements; means biasing the locking member to the remote position; a cam fixed to the support; a key-controlled rotatable follower on the support engaging the cam to effect movement of the follower axially as it rotates; a connection between the follower and locking member for causing movement of the member between its positions in response to axial movement of the follower; and a key associated with the follower for effecting rotation thereof.

2. In a power implement including a boom, ground-engaging accessories associated with the boom, hydraulic means for raising and lowering the boom and operating the ground-engaging accessories, the combination therewith of a hydraulic control structure comprising: a main support; valve structure operatively connected with the hydraulic means carried on the support and including a multiple valve bank with a series of valve control elements, each movable between a neutral zone and an operating zone, each element having a member-receiving portion thereon with each portion being substantially coplanar with the portions of the other elements when the elements are in the neutral zone; a locking member supported on the support for movement toward and away from the elements between a locking position in which the member engages the member-receiving portions of the elements when in their neutral zone and a remote position in respect to the control elements; means biasing the locking member to one of the aforesaid positions; a key-controlled rotatable member on the support; a connection between the rotatable member and locking member for causing movement of the locking member between its positions in response to rotation of the rotatable member; and a key associated with the rotatable member for effecting rotation thereof.

3. In a power implement including a boom, ground-engaging accessories associated with the boom, hydraulic means for raising and lowering the boom and operating the ground-engaging accessories, the combination therewith of a hydraulic control structure comprising: a main support; valve structure operatively connected with the hydraulic means carried on the support and including a multiple valve bank with a series of valve control elements, each movable between a neutral zone and an operating zone; a locking member supported on the support for movement toward and away from the elements between a locking position in respect to the elements when in their neutral zone and a remote position in respect to the control elements; means biasing the locking member to one of the aforesaid positions; a key-controlled movable member on the support; a connection between the movable member and locking member for causing movement of the locking member between its positions in response to movement of the movable member; and a key associated with the movable member for effecting movement thereof.

4. In a power implement including a boom, ground-engaging accessories associated with the boom, hydraulic means for raising and lowering the boom, and operating the ground-engaging accessories, the combination therewith of a hydraulic control structure comprising: a main support; valve structure operatively connected with the hydraulic means carried on the support and including a multiple valve bank with a series of aligned reciprocal valve control elements, each movable from a neutral zone to an operating zone, each element having a member-receiving portion thereon with each portion being substantially coplanar with the portions of the other elements when the elements are in the neutral zone; a locking member supported on the support for movement toward and away from the elements between a locking position in which the member engages the member-receiving portions of the elements when in their neutral zone and a remote position in respect to the control elements; and a key-operated control connected to the locking member for effecting movement of the member between its positions.

5. In a power implement including a boom, ground-engaging accessories associated with the boom, hydraulic means for raising and lowering the boom and operating the ground-engaging accessories, the combination therewith of a hydraulic control structure comprising: a main support; valve structure operatively connected with the hydraulic means carried on the support and including a multiple valve bank with a series of aligned reciprocal valve control elements, each movable from a neutral zone to an operating zone, each element having an insert portion thereon with each portion being substantially coplanar with the portions of the other elements when the elements are in the neutral zone; an elongated locking bar supported on the support for movement toward and away from the elements between a locking position in which the bar engages the insert portions of the elements when in their neutral zone and a remote position in respect to the control elements; and a key-operated control connected to the bar for effecting movement of the bar between its positions.

6. In an earth moving implement having hydraulic means thereon for moving parts thereof into and out of engagement with the ground, the improvement residing in hydraulic control structure for operating the hydraulic means comprising: a main support; valve structure carried on the support including a reciprocal valve control element movable from a neutral zone to an operating zone, the element having an insert portion thereon; a locking member supported on the support for movement toward and away from the element between a locking position in which the member engages the insert portion of the element when in its neutral zone and a remote position in respect to the control element; and a key-operated control operatively connected to the locking member for causing movement of the member between its positions.

7. In an earth moving implement having hydraulic means thereon for moving parts thereof into and out of engagement with the ground, the improvement residing in hydraulic control structure for operating the hydraulic means comprising: a main support; valve structure carried on the support including a valve control element movable from a neutral zone to an operating zone; a locking member supported on the support for movement between a locking position in which the member locks the element against movement when in its neutral zone and a remote position in respect to the operation of the control element; and a key-operated control operatively connected to the locking member for causing movement of the member between its positions.

References Cited in the file of this patent

UNITED STATES PATENTS

| | | |
|---|---|---|
| 887,826 | Maniex | May 19, 1908 |
| 1,192,516 | Grieff et al. | July 25, 1916 |
| 1,372,062 | Carruth | Mar. 22, 1921 |
| 1,588,890 | Horvath | June 15, 1926 |
| 3,090,218 | Birkness | May 21, 1963 |